United States Patent
Swet

[11] 3,780,722
[45] Dec. 25, 1973

[54] FIBER OPTICAL SOLAR COLLECTOR
[75] Inventor: Charles J. Swet, Mt. Airy, Md.
[73] Assignee: The United States of America as represented by the Secretary of the Navy, Washington, D.C.
[22] Filed: Apr. 26, 1972
[21] Appl. No.: 247,774

[52] U.S. Cl. .................. 126/270, 350/96 B
[51] Int. Cl. ................ F24j 3/02, G02b 5/16
[58] Field of Search ........... 350/96 B; 250/227; 126/270, 271; 60/26

[56] References Cited
UNITED STATES PATENTS

| 3,188,478 | 6/1965 | Binks | 350/96 B X |
|---|---|---|---|
| 3,379,394 | 4/1968 | Bialy | 350/96 B X |
| 2,872,915 | 2/1959 | Bowen | 126/271 |
| 3,142,235 | 7/1964 | Siegmund | 350/96 B X |
| 3,469,026 | 9/1969 | Winik et al. | 350/96 B X |
| 3,508,589 | 4/1970 | Derick et al. | 350/96 B X |
| 2,672,288 | 3/1954 | Perrin | 350/96 B X |
| 2,825,260 | 3/1958 | O'Brien | 350/96 B |
| 3,535,016 | 10/1970 | Malifaud | 350/96 B X |

*Primary Examiner*—David H. Rubin
*Attorney*—Richard S. Sciascia et al.

[57] ABSTRACT

The invention is an improved solar collector comprising a fiber optical solar receiver which passively concentrates incident solar energy for delivery as an intensified flux to an absorptive target. In one embodiment of the invention, the present solar collector comprises a boule of fibers shaped into an arcuate collecting surface at one end, the fibers tapering to a flat output plane at the opposing end of the boule. Solar radiation entering the collector at the collecting surface is concentrated within the tapered portion of the boule and delivered as an intensified flux to an absorptive target disposed in operative relation to the output plane, the absorptive target being either a cookpot, a thermal storage mass, or the hot junction of a thermoelectric generator.

6 Claims, 6 Drawing Figures

FIBER OPTICAL SOLAR COLLECTOR

BACKGROUND AND SUMMARY OF THE INVENTION

The present invention relates to solar energy collecting apparatus, and particularly to such apparatus wherein solar energy is concentrated on a small area for useful purposes such as cooking, heat storage, or other uses wherein a high temperature is required.

Solar collectors capable of concentrating incident radiation on a relatively small area have previously operated on the principle of external reflection of radiation to a point of energy concentration by means of parabolic mirrors or polished metal reflectors. These devices are not only bulky and fragile, but the reflective surfaces thereof also degrade rapidly in normal use, thereby further reducing the inherently low efficiencies of such devices. Inconvenience is caused by the need for frequent manual adjustment of the optical axis of these prior art solar collectors, their utility being severely impaired by the necessity for use outdoors during periods of sunlight.

The present invention eliminates or lessens the undesirable features of those devices previously available. Primarily, the present invention efficiently collects energy over a greater range of solar incidence angles than previously attainable in the art, thus eliminating the need for frequent adjustment of the device. Further, the present invention collects, transports, and concentrates radiation internally within a fiber optics boule, thereby eliminating bulky external reflectors which degrade due to environmental conditions. Essentially, the fiber optics boule "internally" reflects the collected solar radiation to a desired point of use. Although nonnormal rays incident on a fiber optics boule constructed according to the invention do result in losses, the overall efficiency of the present invention is measurably greater than previously available "external" collectors. The structure of the present invention makes possible the use thereof with a thermal storage means so that energy may be collected and stored during sunlight hours for later indoor use. The present invention may also be constructed to locate the collecting surface of the fiber optics boule outdoors while the output plane of the boule could be located indoors, thereby providing maximum user convenience.

Essentially, the present invention comprises a fiber optics boule, the enlarged portion of which acts as a solar collector and the reduced portion of which acts as an energy concentrator to focus an intensified flux of energy onto a suitable absorptive target. A plurality of the fiber boules arranged in the form of a planar array, each boule directing energy incident on the collecting surface thereof to the same absorptive target producing a combined output capable of performing useful work. A preferred embodiment of the invention is produced by shaping the collecting surface of each fiber boule into an arcuate form, thereby enabling the device to "see" the sun equally well at any solar incidence angle within the fan-shaped field of view of the collecting surface.

Accordingly, it is an object of the present invention to provide a relatively compact solar collector capable of efficient collection, concentration, and delivery of solar energy impinging thereon to an absorptive target for the beneficial utilization of such energy.

Another object of the invention is to provide a solar collector comprising a fiber optic boule for collecting solar energy and delivering said energy by internal reflection to a point of utilization.

A further object of the invention is to provide a solar collector having an arcuate collecting surface which eliminates the necessity for frequent alignment of the collector with the sun.

Other objects, advantages and novel features of the invention will become apparent from the following detailed description.

DESCRIPTION OF THE PREFERRED EMBODIMENTS

Figure 1:
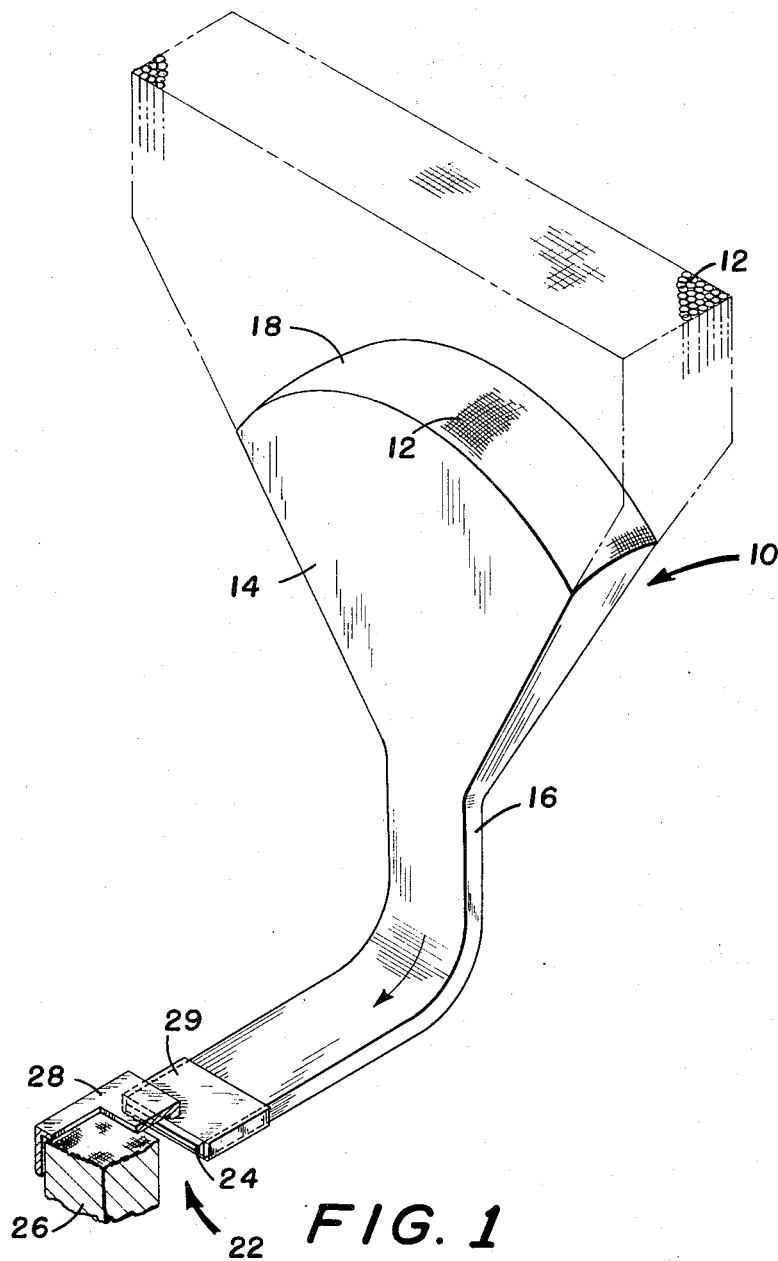
FIG. 1 is a simplified perspective view of a fiber optics boule formed according to a preferred embodiment of the invention and shown in a simplified operative mode, the material from which the boule is cut being shown in phantom.

A significant structural element of the present invention is a fiber optics boule shown at 10 in FIG. 1. The boule 10 is essentially a bundle of glass or plastic fibers 12 which typically have diameters of between 5 and 10 microns. Such passive fibers 12 are usually produced by heating, to a drawing temperature, a glass or plastic tube surrounding a rod of a similar material, a composite fiber being drawn from the heating zone. In this fashion, a fiber is produced with an inner core which has a higher index of refraction than does the outer surface, or cladding, of the fiber. The cladding uniformly contacts the surface of the inner core. Very large numbers of these fibers are fused together, the boule 10 being drawn and shaped out of such a fused bundle of fibers, as shown in phantom in FIG. 1.

The boule 10 is shaped according to a preferred embodiment of the invention, wherein an enlarged wedge-shaped upper portion 14 is seen to taper to a constant cross-sectional lower portion 16, which lower portion 16 may be extended to any practical length and curved within certain known limits to route light passing therethrough along a desired path. The upper surface of the wedge-shaped portion 14 is formed into an arcuate solar collecting surface 18, i.e., the surface 18 is accurately curved in the flat plane of the wedge-shaped portion 14 and rounded in its other dimension to produce a collecting surface which "sees" the sun equally well at any solar incidence angle within the fan shaped field of view resulting from this particular shaping of the surface 18. The instantaneous field of view of the collecting surface 18 comprises only a minor portion of said surface. However, the instantaneous field of view is essentially constant within the relatively wide total field of view of the surface 18. Therefore, the collecting surface 18 is capable of functioning for relatively long periods of time without the necessity for manual adjustment of the boule to provide a more favorable solar incidence angle.

The boule 10 tapers from the collecting surface 18 to the constant cross-sectional portion 16, the tapered or "flared" portion 14 therebetween acting to "concentrate" the light incident on the surface 18 to an intensified flux which follows the fiber optical path provided by the lower portion 16 to an output end 22.

Figure 2:
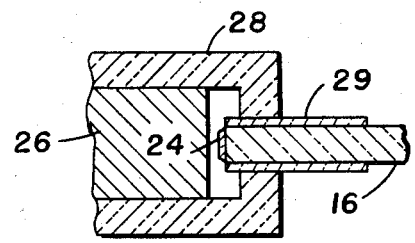
FIG. 2 is a detail sectional view of a portion of the boule and of a portion of an absorptive target which is disposed in operative relation to the boule.

As can be seen more readily in FIG. 2, the output end 22 of the boule 10 is provided with an infrared filter 24 which transmits the intensified flux to a suitably located absorptive target 26, which gets hot. The filter 24 acts as a "cold mirror" to prevent re-entry into the boule 10 of long wave emissions from the heated target 26, thereby minimizing energy losses to the boule. The filter 24 may be a well-known vacuum-deposited Al-Sio coating which passes essentially all of the solar energy being directed at the target 26 and reflects all but a few percent of the longer wave transmissions from the heated target. The target 26 can be a metal hot plate which, in combination with suitable insulation 28, would form the upper surface of an otherwise well-insulated black body cavity. The energy thus concentrated on the target 26 may be directly used for heating, cooking, or for thermoelectric power generation.

The boule 10 may preferably be formed of fibers composed of a polystyrene plastic core with acrylic cladding. When the boule is formed of plastic instead of glass, a glass spacer 29 is generally required to shield the plastic from the high target temperatures. Although the boule 10 may be formed from many thousands of fibers 12, it is desirable to keep the small end diameters of the fibers 12 above two mils in order to minimize losses due to multiple internal reflections in the individual fibers. The flux density gain of the boule 10 is merely the ratio of the respective inlet and outlet areas of the individual fibers, $\alpha_1/\alpha_2$. This value is related to the remaining optical properties of the boule 10 by the following expression:

$$n\sin\theta = [(\alpha_2/\alpha_1)(n^2_1 - n^2_2)]^{1/2}$$

where:
$n$ = the refractive index of the ambient medium, (1.0 for air);
$\theta$ = the maximum solar acceptance angle;
$n_1$ = the core refractive index, (1.59 for polystyrene); and
$n_2$ = the cladding refractive index, (1.49 for acrylic).

This relationship applies only to meridional rays, yielding a conservatively small value for the effective numerical aperture of the boule 10 when skew rays are considered. Essentially, transmission losses for plastic fibers are roughly twenty percent per foot of optical path, the losses being largely in the infrared and sufficiently small in magnitude to allow effective practical use of the invention.

Figure 3:
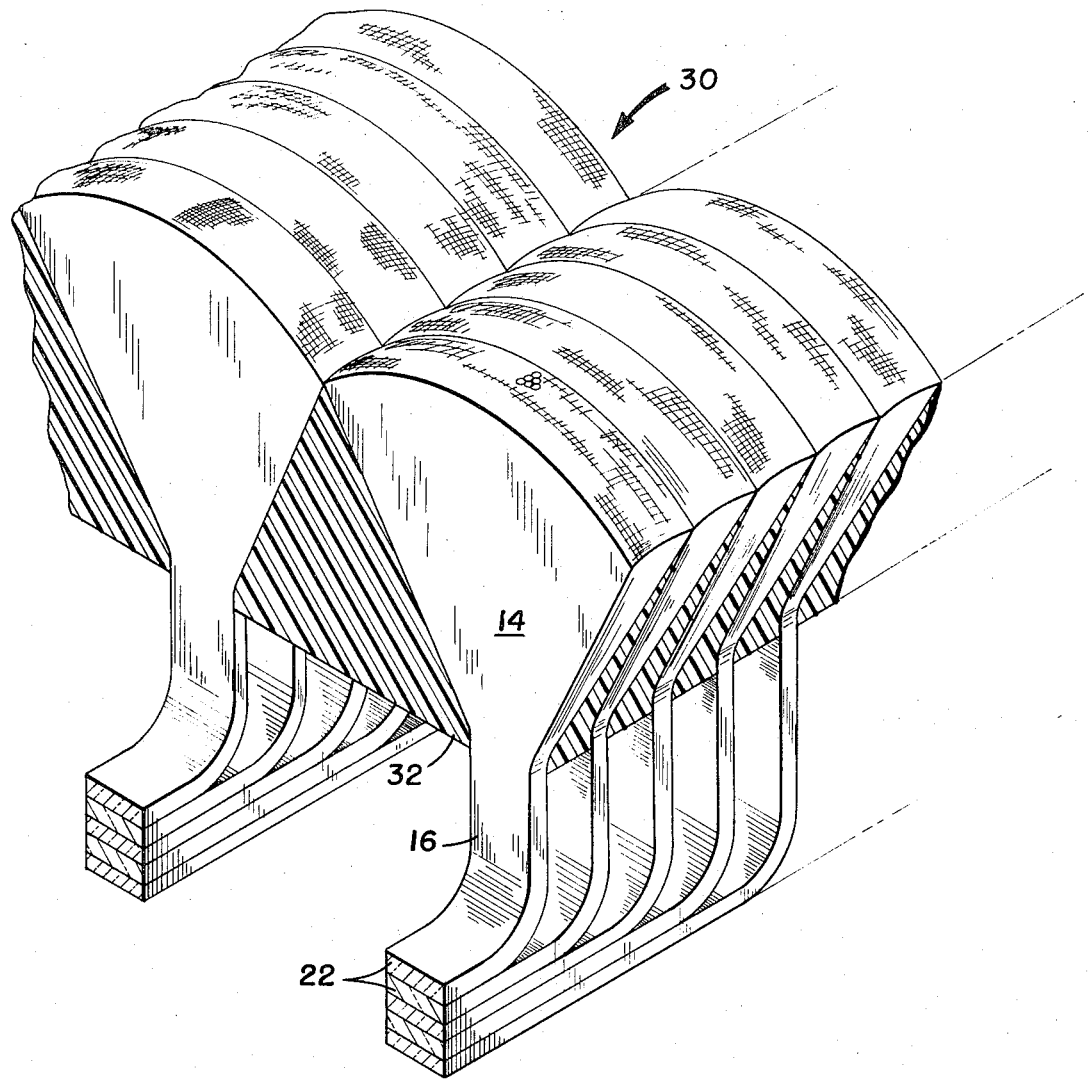
FIG. 3 is a perspective of a portion of a planar array formed by the combination of a plurality of fiber optics boules.
Figure 5A:
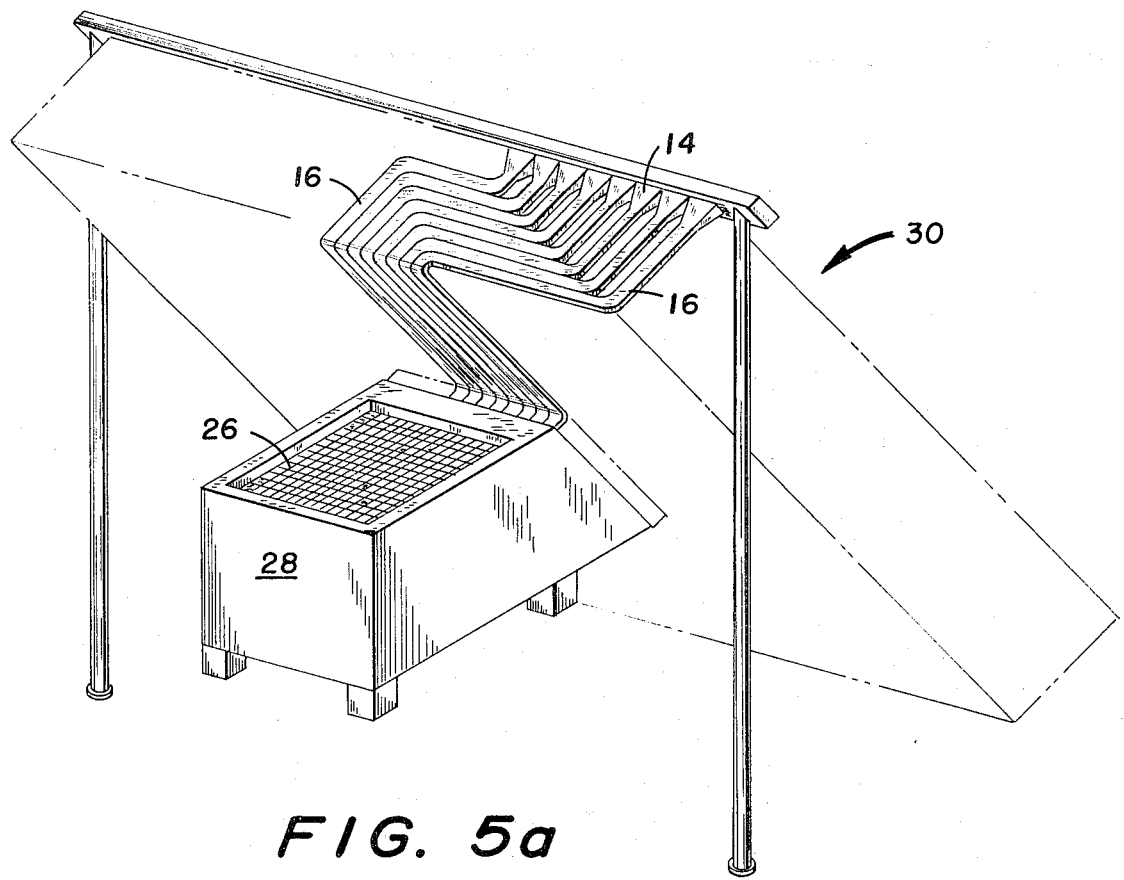
FIG. 5a is a perspective of the present invention in a typical operating mode; and, FIG. 5b is an enlarged detail perspective, partly in section, showing the interface between the output ends of a plurality of boules and an absorptive target.
Figure 5B:
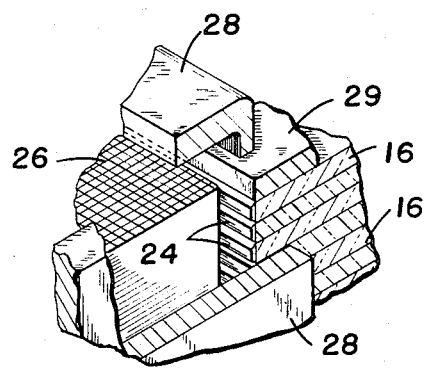

A practical solar collector is formed by disposing a plurality of the boules 10 into a compact array 30, such as is shown in partial perspective in FIG. 3. The boules 10 may be aligned in rows to provide a uniform flux intensity gain across the full field of view of the array 10. The individual boules 10 are spaced apart and insulated by means of a rigid foam plastic filler 32. The lower portions 16 of the boules 10, in a given row, may overlap and extend toward the lower edge of the array 30. Each overlapping series of portions 16 may then extend toward a centrally disposed point along said lower edge, such as is shown in FIG. 5. The output ends 22 of the boules 10 are then all disposed in operative relation to the absorptive target 26, which, as shown in FIG. 5, may comprise a heating plate for a cookpot, etc. Essentially, the solar energy collected and concentrated into an intensified flux by each boule 10 is delivered to a common target.

In actual practice, a planar array 30 which is 4 feet square would "see" the sun for a minimum of 6 consecutive hours. A boule packing density of ninety percent, a mean optical path of 2 feet, and a 90 percent transmittance-reflectance efficiency for the filter 24 are values easily within practical reach. By selecting a flux intensity gain of 25 in the tapered plastic fibers 12 (the gain being dependent in a known fashion by the choice of the angle at which the wedge-shaped upper portion 14 "flares"), the maximum acceptance angle is 6.4° and the sun's rays pass throughout 14.2 percent of the fibers whenever the sun is in view. Under the above conditions, approximately 100 watts would be absorbed by a well-insulated target 26, the target then stabilizing at a usefully high temperature of nearly 900° F. Increasing the flux intensity gain acts to elevate the temperature but reduce the wattage, decreasing the gain having the opposite effects. Decreasing the field of view of the array 30 acts to increase both temperature and wattage but would reduce the total energy delivered to the target.

Figure 4:
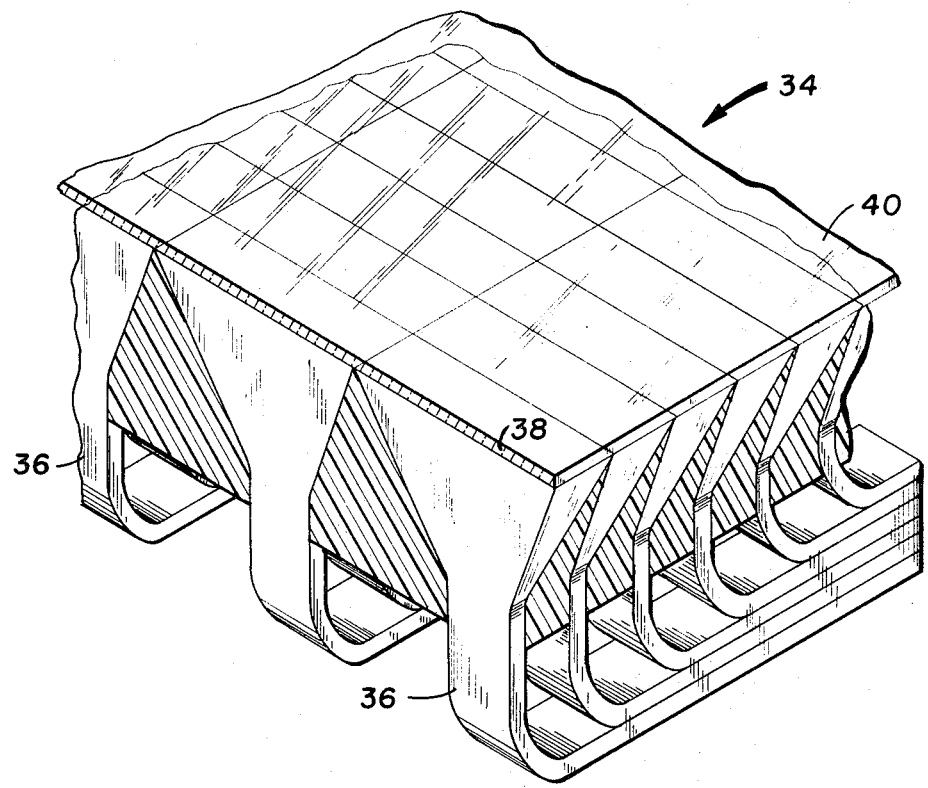
FIG. 4 is a perspective of a planar array wherein the boules are formed with planar collecting surfaces.

A more simple planar array is shown at 34 in FIG. 4. The array 34, while having a lower surface area than the array 30, is less expensive and more easily manufactured. The boules 36 are constructed in the same fashion as the boules 10 except that the collecting surfaces 38 are flat and lie in the common plane of the array surface. Thus, all of the individual surfaces 38 could be machined and polished in one operation and protected with a single sheet 40 of replaceable transparent material.

Since modification of the invention is possible in light of the above description, it is understood that, with the scope of the appended claims, the invention may be practiced otherwise than as specifically described.

I claim:

1. Apparatus for collecting solar energy and conducting the energy to a point where said energy is utilized to perform useful work, the solar energy being collected and utilized efficiently over a continuous period of time without adjustment of the apparatus, the apparatus comprising:

a plurality of boules formed of light-conductive fibers, each boule having an input end and an output end and said fibers extending from said input end to said output end, the input ends of the boules being disposed in a common plane exposed to maximum solar radiation, each boule further comprising an enlarged upper portion which tapers from the input end to a constant thickness at a point between said input end and the output end, and a constant cross-sectional portion which extends from the point of termination of taper of the enlarged upper portion to the output end of the boule, the input end of each boule acting to direct a substantial portion of solar energy incident thereon into the boule wherein said energy is concentrated to an intensified flux within the enlarged upper portion and delivered to the output end of the boule through the constant cross-sectional portion thereof;

a solar energy collecting surface surmounting and integrally formed with the enlarged upper portion of each of the boules, each collecting surface being formed into an arcuate curvature in the major plane of each enlarged upper portion of the respective boules and further being rounded in the dimension perpendicular to said plane, thereby providing a fan-shaped field of view for each boule whereby radiation from the sun is accepted equally well at any solar incidence angle within the field of view; and, an insulated target disposed in the path of the energy passing from the output end of each boule, the constant cross-sectional portion of each boule being shaped to deliver heat flux to the target.

2. The solar energy collecting apparatus of claim 1 and further comprising filter means disposed over the output end of the boule for passing essentially all of the intensified solar flux from the output end to the target and reflecting radiation emanating from the target.

3. The solar energy collecting apparatus of claim 2 wherein the filter means comprises an aluminum-silicon oxide coating.

4. The solar energy collecting apparatus of claim 1 and further comprising a glass spacer disposed about the output end of the boule for thermal shielding of said output end.

5. The solar energy collecting apparatus of claim 1 wherein the fibers are comprised of a polystyrene plastic core having acrylic cladding.

6. The solar energy collecting apparatus of claim 1 and further comprising rigid insulation between the enlarged portions of the boules for support thereof.

* * * * *